(12) United States Patent
Schall et al.

(10) Patent No.: US 8,053,075 B2
(45) Date of Patent: Nov. 8, 2011

(54) CRYSTALLINE ION-CONDUCTING NANOMATERIAL AND METHOD FOR THE PRODUCTION THEREOF

(75) Inventors: Norbert Schall, Forstern (DE); Gerhard Nuspl, Forstern (DE); Christian Vogler, Moosburg (DE); Lucia Wimmer, Landshut (DE); Max Eisgruber, Bruckberg (DE)

(73) Assignee: Sued-Chemie AG, Munich (DE)

( * ) Notice: Subject to any disclaimer, the term of this patent is extended or adjusted under 35 U.S.C. 154(b) by 652 days.

(21) Appl. No.: 11/910,666

(22) PCT Filed: Mar. 9, 2006

(86) PCT No.: PCT/EP2006/002199
§ 371 (c)(1),
(2), (4) Date: Nov. 25, 2008

(87) PCT Pub. No.: WO2006/105848
PCT Pub. Date: Oct. 12, 2006

(65) Prior Publication Data
US 2009/0233096 A1      Sep. 17, 2009

(30) Foreign Application Priority Data
Apr. 5, 2005    (DE) .......................... 10 2005 015 613

(51) Int. Cl.
*B32B 5/66*     (2006.01)
(52) U.S. Cl. ........ 428/402; 423/299; 423/303; 423/306; 423/312
(58) Field of Classification Search .................. 428/402; 423/299, 303, 306, 312
See application file for complete search history.

(56) References Cited

U.S. PATENT DOCUMENTS

| | | | |
|---|---|---|---|
| 3,558,273 A | 1/1971 | Beck | |
| 7,807,121 B2 * | 10/2010 | Nuspl et al. ................... | 423/306 |
| 2004/0151649 A1 | 8/2004 | Hemmer et al. | |
| 2006/0204848 A1 | 9/2006 | Franger et al. | |
| 2007/0054187 A1 | 3/2007 | Nuspl et al. | |

FOREIGN PATENT DOCUMENTS

| | | |
|---|---|---|
| DE | 103 53 266 A1 | 6/2005 |
| FR | 28 48 549 A1 | 6/2004 |
| JP | 2003 292307 | 10/2003 |
| JP | 2004296367 * | 10/2004 |
| WO | WO 99/33129 A | 7/1999 |
| WO | WO 02/083555 A2 | 10/2002 |
| WO | WO 02/099913 A | 12/2002 |
| WO | WO2005/051840 * | 6/2005 |
| WO | WO 2005/051840 A | 6/2005 |

OTHER PUBLICATIONS

Yang, S. et al., "Hydrothermal synthesis of lithium iron phosphate cathodes," Electrochemistry Communications, 2001, vol. 3, pp. 505-508.
Lee, J. et al., "Characteristics of lithium iron phosphate (LiFePO4) particles synthesized in subcritical water," J. of Supercritical Fluids, 2005, vol. 35, pp. 83-90.
Nippon Chem Ind Co Ltd., "Ferrous phosphate hydrate crystal, production method therefore, and method for producing lithium/iron/phosphorous-based complex guide," Patent Abstracts of Japan, Publication Date: Oct. 15, 2003: English Abstract of JP2003292307.
Database WPI Week 200474, Derwent Publications Ltd., London, GB; AN 2004-751801, XP002406043.
Arnold, G. et al., "Fine-particle lithium iron phosphate LiFePO4 synthesized by a new low-cost aqueous precipitation technique," Journal of Power Sources, vol. 119-121, Jun. 1, 2003, pp. 247-251, Amsterdam, NL, XP004430175.
Anderson, A. S. et al., "Lithium extraction/insertion in LiFePO4: an X-ray diffraction and Mossbauer spectroscopy study," Sold State Ionics, vol. 130 No. 1-2, May 2000, pp. 41-52, North Holland Pub. Co.: Amsterdam, NL, XP004197786.
International Search Report dated Nov. 8, 2006 of International Application No. PCT/EP2006/002199.
Yang, Shoufeng et al., "Hydrothermal synthesis of lithium iron phosphate cathodes," Electrochemistry Communications, vol. 3, 2001, pp. 505-508.
German Search Report dated Jan. 13, 2006 of German Application No. 10 2005 015 613.4.

* cited by examiner

*Primary Examiner* — Leszek Kiliman
(74) *Attorney, Agent, or Firm* — Millen, White, Zelano & Branigan, P.C.

(57) ABSTRACT

The invention relates to a crystalline ion-conducting material made of $LiMPO_4$ nanoparticles, wherein M is selected from Cr, Mn, Co, Fe and Ni, in addition to mixtures thereof and the nanoparticles have an essentially flat prismatic shape. The invention also relates to a method for producing said type of crystalline ion-conducting material which consists of the following steps: a precursor component is produced in a solution front a lithium compound of a component containing metal ions M and a phosphate compound, the precursor compound is subsequently precipitated from the solution and, optionally, a suspension of the precursor compound is formed, the precursor compound and/or the suspension is dispersed and/or ground, and the precursor compound and/or the suspension is converted under hydrothermal conditions and subsequently, the crystalline material is extracted.

25 Claims, 2 Drawing Sheets

CRYSTALLINE ION-CONDUCTING NANOMATERIAL AND METHOD FOR THE PRODUCTION THEREOF

The present invention relates to the area of unidimensional ion conductors, in particular a crystalline ion-conducting nanomaterial, preferably a lithium insertion compound having predominantly unidimensional ion conduction, and a method for its production.

Use of solid ion conductors has recently been constantly increasing, particularly in the area of lithium ion batteries. Lithium ion batteries permit far-reaching miniaturization and thus open up further fields of use than conventional nickel-cadmium-based batteries.

Various materials which can be used as electrode materials in lithium batteries were proposed. In particular, the structure and form of such materials, which play a major role in the efficiency of these materials were also investigated (Tang and Holzwarth, Phys. Rev. B 68, 165107 (2003)).

In addition to lithium cobaltates and nickelates and lithium metal vanadates, in particular lithium metal phosphates or the doped derivatives thereof which have an olivine structure have recently been proposed (Goodenough et al., J. Electrochem. Soc. Vol. 144 (1997), U.S. Pat. No. 5,910,382, JP-3484003 B).

In particular, lithium iron phosphate and structurally analogous doped derivatives thereof have proved to be particularly promising among these. The morphology and their influence on the electrochemical properties of $LiFePO_4$, the doped derivatives thereof and crystallites thereof optionally coated with carbon are disclosed in US 2004/0033360.

In the $LiFePO_4$ structure, the oxide ions have a hexagonal close packing (hcp). The iron ions (or the metal ions which partly replace them in the doped derivatives) form zig-zag octahedral chains in alternating basal planes which are bridged by tetrahedral phosphate groups. The strong covalent P—O bond in the phosphate tetrahedra permits greater stabilization of the structure compared with layer-like oxides, such as $LiCoO_2$. The stabilization prevents the phosphate in the delithiated state from releasing oxygen at elevated temperature, which improves the safety of a battery produced therefrom.

$LiFePO_4$ is a so-called unidimensional conductor in which the lithium ion conduction takes place perpendicularly to the 0k0 lattice planes in the crystal.

It is known that the micromorphology of electrically conductive materials influences their power and capacitance. In general, smaller particles have a larger surface area and hence a higher power, whereas larger particles have a smaller surface area and a lower power. On the other hand the compaction effect in the case of smaller particles appears to be less efficient. Moreover, smaller particles can, for example be more poorly packed on surfaces. Typically, larger particles which are easier to pack but generally reduce the total energy capacity have therefore been accepted to date.

Narang et al. (U.S. Pat. No. 6,337,156) describe a special optimized morphology for a special metal oxide structure for use of these metal oxides in electrodes. These metal oxides are the layer structures of $LiCoO_2$ and $LiNiO_2$ which differ structurally from $LiFePO_4$. Accordingly, there appears to be a correlation between the special layer structure of said crystals and the geometrical requirements disclosed by Narang et al. with regard to the particle morphology. Accordingly, particles of materials for this class of compounds must have a length of at least about 20 μm in their longest dimension (preferred geometrical direction). Smaller particles are unsuitable for these materials. The morphology of these large particles can thus assume different forms, such as needles, strips, fibers, etc., and can be chosen arbitrarily as long as only the longest dimension of the geometrical form is greater than the other two and has a length of at least about 20 μm. However, the electrodes produced in this manner do not have a good capacitance.

The particular problem of the morphology of metal phosphates of the general formula $LiMPO_4$ having an olivine structure compared with the layer oxides, which problem arises from the different crystal structure, is not mentioned by Narang et al.

It was therefore the object to provide an optimized morphology for materials of the general formula $LiMPO_4$ having an olivine structure, which have improved electrochemical properties, such as, for example, improved lithium ion conductivity.

This object is achieved by the provision of a crystalline ion-conducting material consisting of $LiMPO_4$ nanoparticles, M being selected from Cr, Mn, Co, Fe and Ni and mixtures thereof, the nanoparticles having a substantially flat prismatic shape and a monomodal size distribution. In further preferred embodiments, the material also has a bimodal size distribution.

The material according to the invention has an olivine structure (space group No. 62, Pnma), whose unit cell is defined by the flat prismatic structure in such a way that a family of successive lattice planes runs parallel to the basal face of the prism. At least two parallel lattice planes should therefore preferably lie in the flat prism since this is easier to produce. Of course, it is also possible to produce nanoparticles according to the invention which contain only a single lattice plane. In addition to the pure metal phosphates, the doped analogues thereof are of course also within the scope of the invention, i.e. phosphates whose transition metal lattice sites may be occupied by two or more different transition metal ions, such as Mn, Co, Cr, Fe, etc., and, for example, can be described by the nonstoichiometric formulae such as $LiM_{1-x}M_{2y}PO_4$, $LiM_{1-x}M_{2y}M_3O_4$, etc.

Lithium metal phosphates having an olivine structure can be described structurally in the rhombic space group Pnma (No. 62 of the International Tables), as already mentioned above, the crystallographic arrangement of the rhombic unit cell preferably being chosen here so that the a axis is the longest axis and the c axis is the shortest axis of the unit cell Pnma, so that the plane of symmetry m of the olivine structure is perpendicular to the b axis. The lithium ions of the lithium metal phosphate are then ordered in the olivine structure parallel to the crystal axis [010] or perpendicular to the crystal face {010}, which is therefore also the preferred direction for the unidimensional lithium ion conduction.

The family of successive lattice planes is preferably the family of the 0k0 lattice planes, in which k is an integer $\geq 1$. The lithium ion conduction takes place perpendicularly to this family of 0k0 lattice planes, since in particular the Li—Li distance in the solid is minimized there.

Very particularly preferably, the family of 0k0 lattice planes contains the 020 lattice plane through which—owing to the crystal structure, i.e. the position of the lithium ions in the solid—the major part of the lithium ion conduction takes place. In other words, the material according to the invention consists morphologically of crystals having a flat prismatic habit according to {010}, which can pack particularly closely in the planer in particular in a battery electrode. This means that the two faces of the rhombic pinacoid {010} have the largest area, i.e. are in the form of basal faces, while the remaining crystal faces {hkl} are small or narrow so that as short a conduction path as possible for the lithium ions perpendicular to {010} is ensured with nevertheless close particle packing.

In the material according to the invention, the families (0k0) of lattice planes are parallel to the morphological crystal face {010} at the structural level. If the crystals according to the invention which are flat prisms according to {010} are preferably arranged parallel according to {010} in the plane, for example on a sample holder, the families (0k0) of lattice planes are also preferably arranged parallel to this plane and the orientation function of the lattice plane normals to (0k0) has a maximum in the direction of the normals to the plane of the sample holder. Accordingly, the orientation functions of the perpendicular lattice plane normals to (h01) have a minimum in the direction of the normals to the plane. In a powder sample with randomly distributed orientation of the crystals, on the other hand, none of the orientation functions usually has a maximum or minimum.

X-ray powder diffractometry according to Bragg-Brentano geometry is based on the reflection of monochromatic X-rays by the families of lattice planes of a crystal lattice and has the property that only those families of lattice planes give a reflection which are parallel to the focusing circle of the diffractometer. This means that the intensities of the measured X-ray reflections are weighted with the orientation function of the associated families of lattice planes perpendicular to the tangential plane of the focusing circle. Consequently, the X-ray reflections having the indices 0k0 of the material according to the invention have a relatively stronger intensity and the X-ray reflections h01 have a relatively stronger intensity the X-ray reflections of a comparative material without a preferred orientation according to {010}, provided that a preparation method for the X-ray sample is used which permits a parallel arrangement of the flat prismatic crystals according to the invention according to {010} and provided that the sample is mounted with the orientation plane tangential to the focusing circle of the diffractometer. This different intensity ratio is referred to as a "texture effect". Expressed otherwise: the term "texture effect" is an expression of the distribution of different crystal faces in the material. This means that the majority of the lattice planes in a crystal, preferably a family of lattice planes, is present with a higher probability. In the present invention, this effect is observed for the group of (0k0) planes in the [0k0] direction, which advantageously means that the lithium ion transfer through the nanomaterial according to the invention, which takes place perpendicularly to these crystal faces, is permitted and improved.

It is of course also possible to mount a substrate which has the flat prismatic crystals and on which the flat prismatic crystals are preferably oriented parallel to the substrate plane directly in the diffractometer tangentially to the focusing circle. The texture effect, together with scanning electron-microscopy, is therefore suitable for detection of the material according to the invention.

The texture effect can be established particularly advantageously from the intensity ratio of the superposed reflections 020+211 to 301, because these reflections are close together in the X-ray powder diffraction pattern and therefore similar systematic errors apply to them, so that their intensity ratio can be measured particularly reliably. It has been found that the material according to the invention which has been prepared and measured in this manner is distinguished by an intensity ratio I(020+211):I(301) greater than 2.6:1, preferably greater than 3:1, particularly preferably greater than 3.5:1. In very particularly advantageous embodiments, this ratio is even greater than 6:1, even more preferably greater than 12:1.

Surprisingly, this texture effect reduces the diffusion path length of lithium ions in the [0k0] direction by more than 10% compared with a lithium transition metal phosphate material without such a texture effect. Preferably, the length of the diffusion path length is reduced by more than 25%, even more preferably by more than 50%.

The texture effect is also observed in mixed (doped) phosphates, such as $LiFe_{1-x}M'_yM''_zM'''_uPO_4$, which, for the purposes of the present invention, are likewise covered by the general formula $LiMPO_4$, as stated above. In the case of these mixed or doped compounds, one or more different transition metals M', M'', M''', such as Ni, Co, Mn, Ti, etc. occupy, in different concentrations and different numbers, the octahedral sites of the iron octahedra in the olivine structure, and in which x, y, z and u are a number from 0 to 1 and (y+z+u) is $\leq x$. Of course, isocharge and aliovalent substitutions are also included within the abovementioned general formulae.

In a further preferred embodiment, the flat prism of the crystals of the nanomaterial according to the invention consists of an n-sided prism, n being an integer $\geq 4$. It has been found that although trigonal prisms likewise give very good electrical properties, with regard to the packing of such flat prismatic crystals, polygonal prisms which satisfy the above condition are particularly preferred. In other words, the crystal faces {010} are substantially isometric and are combined with 4 or more narrow and elongated crystal faces {h01} perpendicular to {010}. The combination of isometric pseudohexagonal faces {010} and 6 crystal faces {h01} is particularly preferred because six-sided flat prismatic particles particularly readily adopt a flat arrangement in the plane and can be closely packed.

It is further preferable if the dimensions of the prism obey the condition that the ratio of the length l of the basal face of the prism to its height h is $\geq 4$. This ensures that only a minimum number of lattice families which preferably contain the 020 lattice plane are present in the crystal and hence the conductivity of the crystal or of a corresponding crystal powder is improved.

The advantage of the abovementioned dimensions of the material according to the invention is that the particles provide a larger surface area to a special lattice face. A higher packing density of up to 2.5 g/cm³ of such flat prismatic particles can also be achieved.

Owing to the particular morphology explained below, the disadvantages of small particle sizes which are described above are avoided in the case of the nanomaterial according to the invention. It is therefore furthermore particularly preferred if the ratio of the mean diameter of the basal faces {010} to the height h of the flat prismatic crystal is predominantly greater than 4:1. In particular, it is preferable if the mean diameter of the basal faces is in the range from 1 to 15 μm, preferably from 1 to 5 μm, and the height is from 10 to 100 nm. Said morphological properties can be detected, for example, using a scanning electron microscope.

For the purposes of the present invention, it is important as a whole that the abovementioned advantages relate not only to doped and undoped lithium iron phosphate particles but also to other olivine structures, such as $LiMnPO_4$, $LiCoPO_4$, $LiNiPO_4$, etc.

As already described above, when they are used as a regularly or irregularly packed layer in or on an electrode in a battery at high charge-discharge currents, excessively large nanomaterial particles lead to kinetically controlled limitation of the capacitance which can be withdrawn from an accumulator, if the nanomaterial according to the invention is used as electrode material, since the lithium ions can no longer migrate sufficiently rapidly through the boundary layer $LiFePO_4/FePO_4$. The small flat prismatic particles according to the invention described above are therefore particularly advantageous in such applications.

The object of the present invention is furthermore achieved by a method for the production of the crystalline nanomaterial according to the invention. This method comprises the steps
a) of production of a precursor compound in solution, the precursor compound being composed of a lithium compound, a compound containing metal ions M and a phosphate compound,
b) of precipitation of the precursor compound from the solution and optionally of formation of a suspension of the precursor compound
c) of dispersing and/or of milling of the precursor compound and/or of the suspension during precipitation,
d) of reaction of the precursor compound and/or of the suspension under hydrothermal conditions,
e) of isolation of the crystalline material.

By the combination of dispersing and/or milling during the precipitation of the precursor material in combination with the subsequent hydrothermal reaction, a monomodal nanomaterial according to the invention is surprisingly obtained which is present in the form of flat prisms and has a uniform size distribution. The crystallization of the nanomaterial can thus be controlled in the direction of the desired flat prismatic, lamellar morphology. The metal ions M are selected from Cr, Mn, Co, Fe and Ni and mixtures thereof so that, as already described above, a multiplicity of doped and undoped materials adapted to specific requirements can also be provided.

Compared with conventional sintering methods the hydrothermal treatment which, in a very particularly preferred embodiment, is effected with simultaneous stirring of the suspension has the advantage that surprisingly firstly the morphology and secondly the particle size distribution can be established in a targeted manner. This is achieved in particular by the temperature program chosen there and by the energy input of the stirrer used, in particular by the regulation of the stirrer speed during the hydrothermal treatment.

Step b), the optional formation of a suspension, also has a surprising influence on the crystallite morphology, since the concentration of the suspension plays a role in influencing the shape of the crystallites.

Step d) is preferably carried out with stirring at a temperature in the range from 100 to 250° C. and at a pressure of from 1 bar to 40 bar vapor pressure in order to obtain the nanomaterial according to the invention. A typical temperature protocol for the hydrothermal treatment is, for example, heating over 1 to 2.5 hours from about room temperature or slightly elevated room temperature, such as, for example, from 30 to 45° C., to a temperature range of from 130 to 185° C., in which the precursor compound or the suspension thereof is kept over a period of about 8 to 13 h, followed by slow cooling of the suspension to room temperature over a period of from 2 to 5 h.

As mentioned further below, in a further embodiment, the hydrothermal treatment can be followed by isolation of the nanomaterial according to the invention from the suspension, for example by means of filtration and/or centrifuging. An optional step for washing the material according to the invention is also useful in a further embodiment. This is the case particularly when the salt load in the end product is to be reduced. Careful drying is then required in those cases when it is planned to use the nanomaterial according to the invention, for example, as electrode material in lithium ion batteries, since even small traces of moisture can cause decomposition of the electrolyte.

Drying, if required, is effected, for example, under inert gas. The drying can be carried out over a wide temperature range, for example from about 50 to 750° C., without a change of crystal morphology occurring.

The dispersing or milling treatment in step c) is preferably carried out before the precipitation of the precursor compound is complete, so that the desired monomodal particle distribution is ensured.

In further preferred embodiments of the method according to the invention, in step a) of the method according to the invention, a "template compound", preferably a cationic template compound, for example a quaternary ammonium salt or another class of compound, such as another surface-active compound, such as, for example, polyacrylimides, polysugars (e.g. cationic starch) or polyethyleneimines, which serve as a seed or matrix for the precipitation of the desired precursor material, is furthermore added. It was surprisingly found that the function of these "template compounds", i.e. of the quaternary ammonium salts, e.g. tetraalkyl-ammonium halides, or said polyacrylimides or polyethyleneimines, is to become attached via their positively charged part over a large area to the resulting negatively charged crystal surfaces of $LiMPO_4$ and thus to block these surfaces for further growth so that crystals can grow only on the faces perpendicular thereto. Thus, these "template compounds" reduce the specific surface energy of the growing crystallites. This preferably leads to the growth of particularly flat prisms being favored over other crystal forms. Surprisingly, it was moreover found that the addition of such a "template compound" can also take place in step c) and/or d), i.e. also during or simultaneously with the disperser treatment, in order to give the desired particle morphology.

It is furthermore preferred if the at least three components in step a) are mixed with one another in the concentration ratio of 1:1:1 or with an Li excess of 1:1:3. Deviations of said ideal ratios of about 10-20% each from the abovementioned ratios can be tolerated. An excess of Li can even be envisaged in individual cases for achieving a certain morphology.

Preferred and practical starting compounds for carrying out the method according to the invention are LiOH or $Li_2CO_3$ in the case of the lithium compound. Metal compounds used are compounds of transition metals of the first series, such as Mn, Cr, Co, Fe and Ni, preferably their sulfates, halides, nitrates, phosphates, carboxylates and acetylacetonates. The phosphate compound is a phosphoric acid, a phosphate, a hydrogen phosphate or a dihydrogen phosphate. The preparation of the precursor compound is effected in a polar solvent; in general, this will be water.

The present invention is further explained in more detail with reference to working examples and figures which are understood as being non-limiting. There:

WORKING EXAMPLES

Example 1

Figure 1:
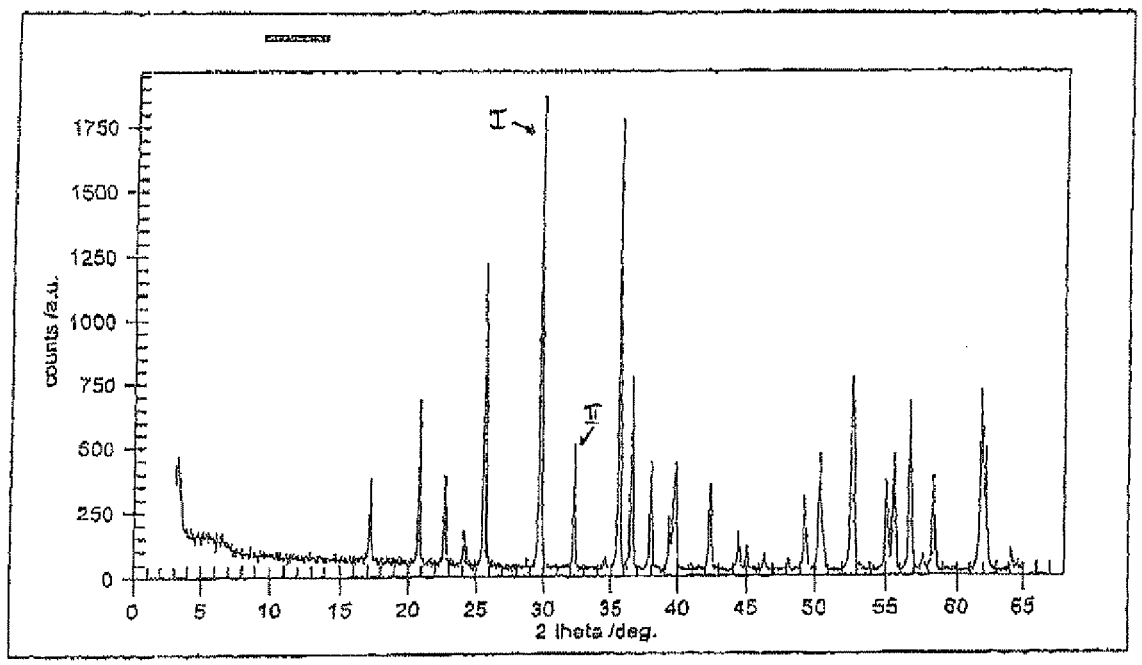
FIG. 1 shows a powder diffraction pattern of the nanomaterial according to the invention.

Production of $LiFePO_4$ by the Method According to the Invention

The reaction of the individual starting materials to give the precursor material was effected according to the following equation:

$$FeSO_4 \cdot 7H_2O + H_3PO_4 + 3LiOH \cdot H_2O \rightarrow LiFePO_4 + Li_2SO_4 + 11H_2O$$

$LiFePO_4$ can be stored as a finished product at room temperature in the air without oxidation.

In the case of the production of $LiFePO_4$ according to the stated equation, it should be noted that $LiFe^{II}PO_4$ is precipitated from an aqueous $Fe^{+II}$ precursor solution. The reaction and drying/sintering are therefore effected under inert gas or in vacuo in order to avoid a partial oxidation of $Fe^{+II}$ to $Fe^{+III}$ associated with the formation of byproducts, such as $Fe_2O_3$ or $FePO_4$.

Production and Precipitation of a Precursor Mixture 417.04 g of $FeSO_4 \cdot 7H_2O$ were dissolved in about 1 l of distilled water, and 172.74 g of 85% strength phosphoric acid were added slowly with stirring. The volume was then made up to 1.5 l with distilled water. The acidic solution was initially introduced into a laboratory autoclave (volume: 1 gallon) at a stirrer speed of 400 rpm, and the autoclave was fed with about 6-7 bar nitrogen via a dip tube and let down again via the relief valve. This process was repeated twice. 188.82 g of lithium hydroxide $LiOH \cdot H_2O$ were dissolved in 1 l of distilled water.

On the autoclave, a disperser is connected between relief valve and bottom discharge valve for carrying out the dispersing or milling treatment according to the present invention. For the purposes of the present invention, any desired commercially available disperser may be used. Examples of suitable dispersers are, for example, the disperser from IKA, Labor Pilot 2000/4 having a UTL dispersing chamber. All that is important in connection with the present invention is that the pumping direction of the disperser is in the direction of bottom discharge valve—disperser—relief valve. The disperser is started at medium speed, typically from 12 to 15 000 rpm, according to the instructions of the respective manufacturer.

The prepared LiOH solution was then pumped by means of a pump, for example a prominent membrane pump or another pump suitable for this purpose, via the dip tube into the autoclave. Typical performance features of a suitable pump are a stroke of 100%, 180 strokes/minute; this usually corresponds to the maximum performance of the pump and to flushing with about 500 to 600 ml of distilled water. The process took about 20 minutes, the temperature of the resulting suspension increasing to about 35° C. The addition of the correct amount of water and hence the chosen concentration of the suspension likewise influences the crystallite morphology. It has been found that, with the abovementioned values, the flat prismatic crystallites of the invention can be particularly reliably obtained. After pumping in and flushing, the suspension in the autoclave was heated to 50° C. All that is important here is that the temperature range from 40 to 80° C., particularly preferably from 45 to 65° C., be maintained. After addition of the lithium hydroxide, a greenish-brown precipitate was separated out.

The disperser, which was started before the beginning of the LiOH addition, was used for a total of about 1 hour for thorough mixing or milling of the very viscous suspension formed after pumping in of the LiOH solution at 500° C. The median particle size was then D90=13.2 μm.

The measurement of the particle sizes in the precursor suspension was effected with the aid of methods known to the person skilled in the art, for example by means of light scattering (CCD measurement) on suspended crystallites.

The use of a disperser produced very thorough mixing and deagglomeration of the precipitated viscous preliminary mixture. In the precipitation and crystallization of the precursor suspension which take place, a homogeneous mixture of many small crystal seeds of about the same size formed as a result of the preliminary milling or thorough mixing in the disperser. These crystal seeds crystallized during the subsequent hydrothermal treatment to give very uniformly grown flat prismatic crystals of the end product $LiFePO_4$ with a very narrow particle size distribution. The power or energy input over the dispersing treatment was more than 7 kW/m³ or more than 7 kWh/m³ of the treated precursor mixture/suspension.

Hydrothermal Treatment:

The suspension freshly prepared in each case was hydrothermally treated in an autoclave. After switching off and clamping off the disperser, the batch was heated beforehand to 160° C. for 1.5 hours. As already mentioned above, the temperature protocol during the hydrothermal treatment is also important for obtaining the material according to the invention. Prior to the heating of the suspension, the autoclave was flushed with nitrogen or another inert gas in order to displace air present from the autoclave before the hydrothermal process. Crystalline $LiFePO_4$ in the form of flat prisms formed from hydrothermal temperatures of about 100 to 120° C.

A particularly preferred temperature protocol for the hydrothermal treatment is, for example, heating over 1 to 2.5 hours from about room temperature or slightly elevated room temperature, such as, for example, 30 to 45° C., to a temperature range from 130 to 185° C. in which the precursor compound or the suspension thereof is kept over a period of about 8 to 13 h, followed by slow cooling of the suspension to room temperature over a period of from 2 to 5 h. In the present case, the hydrothermal treatment was carried out at 160° C. over 10 hours and then cooling was effected to 30° C. over 3 hours.

It is also preferable if the suspension is stirred during the hydrothermal treatment. Here too, the type of stirrer is arbitrary, but the stirrer types already mentioned above are preferably used, skew-blade stirrers having proven particularly advantageous. Typical speeds of the stirrer used are from 250 to 600 rpm, preferably from 350 to 450 rpm.

After the hydrothermal process, the nanomaterial according to the invention was filtered off and washed. The $LiFePO_4$ according to the invention can then be dried, without visible oxidation, in air or in a drying oven, for example at temperatures of about 40° C.

Alternatively further processing of the above-described material obtained was subsequently also effected, in which the filtration conditions were different:

After the hydrothermal treatment, the cooled suspension (not more than 30° C.) was pumped under a nitrogen atmosphere through the bottom discharge valve of the autoclave into a pressure filter (so-called "Seitz filter"). The pump, for example a prominent membrane pump, was adjusted so that a pressure of 5 bar is not exceeded. The filtercake was rinsed with distilled water until the conductivity of the wash water falls below 200 μS/cm.

The filtercake was predried at 70° C. overnight in a vacuum drying oven to a residual moisture content below 5% and then further dried in an inert gas oven ("Linn KS 80-S") under a forming gas stream (90% $N_2$/10% $H_2$) of 200 l/h at 250° C. to a residual moisture content of <0.5%. The $LiFePO_4$ nanomaterial according to the invention was then deagglomerated in a laboratory rotor mill (Fritsch Pulverisette 14") with a 0.08 mm screen.

The resulting typical particle size distribution of the finished $LiFePO_4$ (with disperser treatment, after hydrothermal treatment, drying and deagglomeration as described above) was, for values based on the particle fraction (%), D50 value less than 0.5 μm; D10 value less than 0.35 μm; D90 value less than 2.0 µm; difference between the D90 value and the D10 value less than 1.5 µm. It was found that a uniform size (monomodal size distribution) and shape of the resulting nanomaterial according to the invention could be achieved by means of the disperser and hydrothermal treatment. Of course, a specific bimodal distribution of the particle sizes is also possible by a suitable choice of the dispersing and hydrothermal conditions. FIG. 1 shows a powder diffraction pattern and FIG. 2 a scanning electron micrograph of the product thus obtained.

Surprisingly, it was found that the material according to the invention has a so-called "texture effect" on diffraction by the powder sample of the crystallites according to the invention. This change relates to the intensity of the reflections assigned to 0k0 and in particular to the reflection which corresponds to the 020 lattice plane (marked as I). What is striking is the ratio of this reflection to the reflection II perpendicular thereto, which corresponds to the 301 lattice plane. The ratio I:II is >3.5 in the present case. Since the lithium ion conduction takes place perpendicularly to the 0k0 family of lattice planes, in particular perpendicular to the 020 lattice plane, the occurrence of this so-called "texture effect" is an indication of a particularly pronounced lithium ion conduction of the nanomaterial according to the invention.

As already stated, this texture effect can be particularly advantageously established from the intensity ratio of the superposed reflections 020+211 to 301 because these reflections are close together in the X-ray powder diffraction pattern and systematic errors are therefore applicable to them, so that their intensity ratio can be particularly reliably measured. It has been found that the material according to the invention which has been prepared and measured in this way is distinguished by an intensity ratio I(020+211):I(301) greater than 2.6:1, preferably greater than 3:1, particularly preferably greater than 3.5:1.

Figure 2:
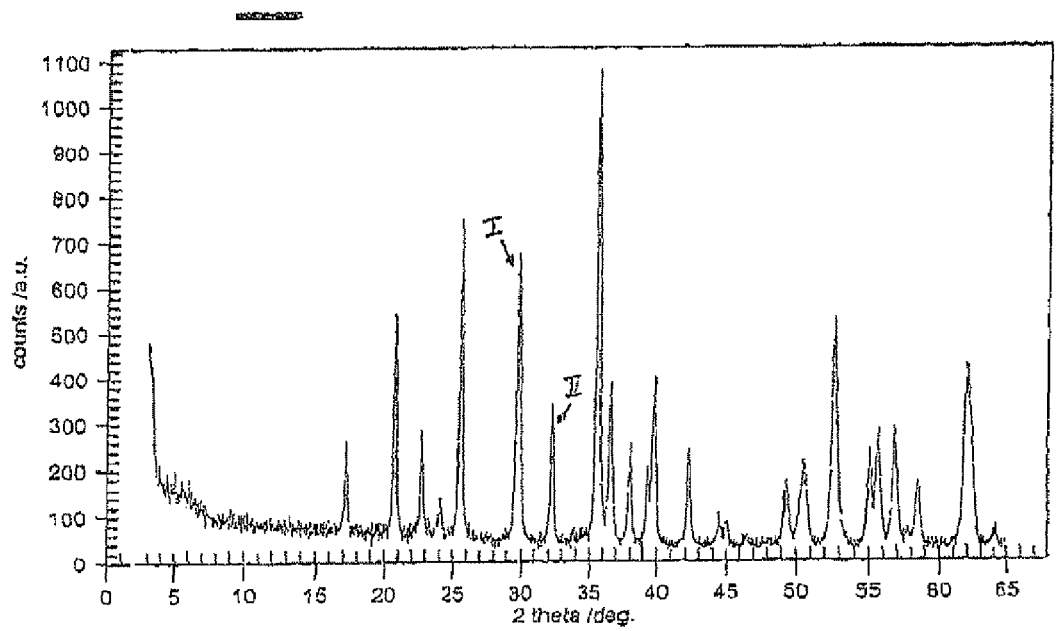
FIG. 2 shows a powder diffraction pattern of a conventional nanomaterial.

This texture effect is particularly pronounced compared with a material of the prior art, as shown in FIG. 2. There, the corresponding ratio is less than 2.6.

Figure 3:
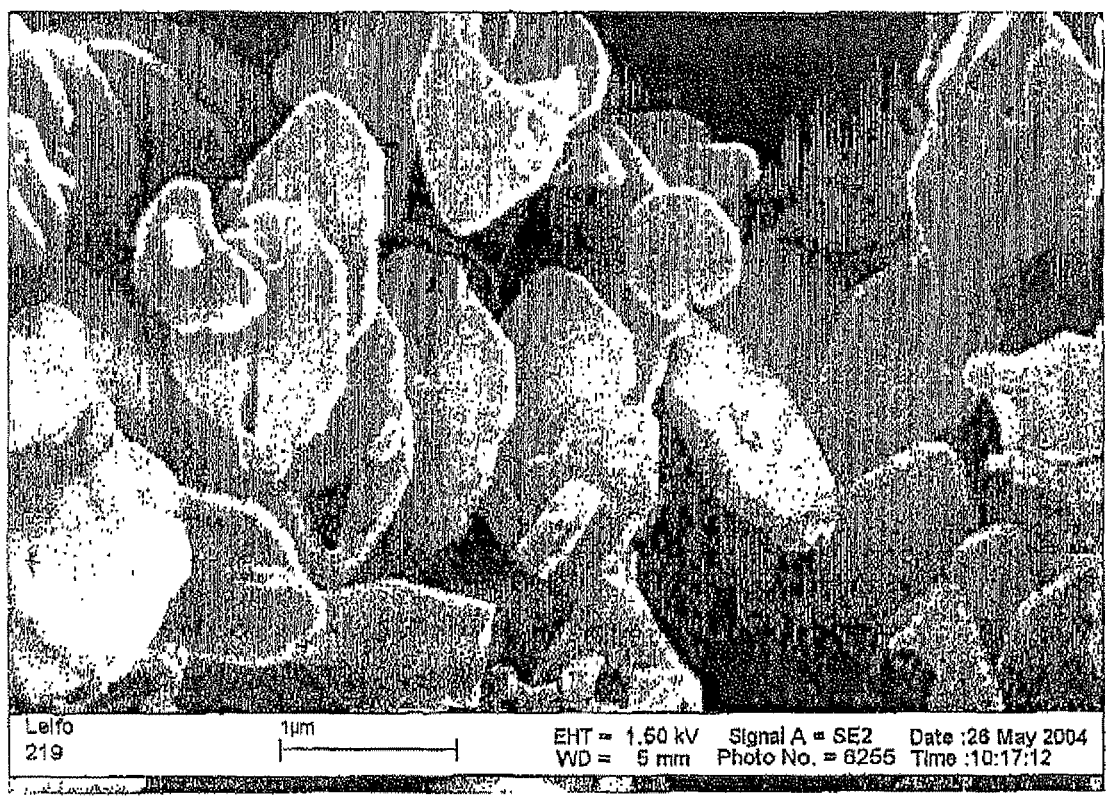
FIG. 3 shows a scanning electron micrograph of the nanomaterial according to the invention.

FIG. 3 shows a scanning electron micrograph of the nanomaterial according to the invention, and the monomodal size distribution of the flat prisms is evident.

Comparative Example

For comparison, $LiFePO_4$ was produced by the same synthesis method as described in example 1, but without the disperser treatment. Under otherwise identical reaction conditions a substantially broader particle size distribution of different crystal form with a greater proportion of intergrown agglomerate structures was obtained. The $D_{90}$ value (based on volume fraction or on number of particles) was more than 200 µm after addition of the LiOH solution. The $LiFePO_4$ obtained likewise consisted of a pure phase but had a multiplicity of different crystal forms and moreover a substantially coarser (multimodal) particle size distribution of the finished $LiFePO_4$ (after hydrothermal treatment, drying and deagglomeration).

Example 2

Production of $LiFePO_4$ by a Method According to the Invention, Including Hydrothermal Treatment $LiFePO_4$ was produced by the same synthesis method as described in example 1, but the disperser (in this case a disperser from IKA, Ultraturrax® UTL 25 Basic Inline with dispersing chamber DK 25.11) was operated at the highest speed. The particle size of the suspension after disperser treatment was $D_{90}=10.8$ µm.

The hydrothermal treatment, filtration, drying and deagglomeration were effected as stated in example 1. The resulting typical particle size distribution (values based on the particle fraction (%)) of the monomodal flat prismatic $LiFePO_4$ were as follows: D50 value less than 0.5 µm; D10 value less than 0.35 µm; D90 value less than 2.0 µm; difference between the D90 value and the D10 value less than 1.0 µm.

In electrochemical tests, the $LiFePO_4$ nanomaterial according to the invention showed the best properties when used as an electrode, in particular at high charge/discharge rates, compared with the comparative material and a material produced by a pure sintering method according to the prior art.

Example 3

Production of $LiFePO_4$ by the Method According to the Invention, Including Hydrothermal Treatment 21.894 kg of $FeSO_4.7H_2O$ were dissolved in 42 l of demineralized water, and 9.080 kg of 85% strength phosphoric acid were added slowly with stirring. The acidic solution was initially introduced into an enameled 200 l autoclave with anchor stirrer and stirred at 45 rpm. The head space of the autoclave was flushed with nitrogen prior to closing. The acidic solution was circulated by means of a centrifugal pump with a power consumption of about 5 kW and with a measured flow rate of on average 7000 l/h. The solution is removed via the bottom discharge valve of the autoclave and fed back via a cover flange. 10.289 kg of $LiOH.H_2O$ are dissolved in 62 l of demineralized water. This alkaline solution is fed via a monopump and an injector nozzle to the circulated acidic solution on the pressure side of the centrifugal pump. This process takes 15 min, the temperature of the circulated solution increasing from 18.3° C. to 42.1° C. The resulting suspension is further circulated for 45 min by means of the centrifugal pump and stirred by means of the anchor stirrer at 45 rpm, the temperature further increasing to 51.1° C. According to the invention, the centrifugal pump with its high turbulence effect ensures the formation of a finely divided suspension during the entire process, it being possible to achieve particle size distributions comparable to those in example 1.

After the external devices had been switched off and clamped off, the autoclave was closed pressure-tight and heated to 160° C. with constant stirring at 90 rpm in 1.5 h and kept at this temperature for 10 h. Thereafter, it was cooled to 20° C. in the course of 3 h, and the finished $LiFePO_4$ suspension was filtered analogously to example 1 in a "Seitz filter". The pH of the filtrate was 7.5. Washing was then effected with demineralized water until the filtrate has a conductivity of less than 480 µS. The whitish gray, solid filtercake which tends to liquefy was dried at 70° C. overnight in a vacuum drying oven at <100 mbar and deagglomerated in a laboratory rotor mill ("Fritsch Pulverisette 14") having a 0.08 mm screen. The particle size distributions obtained thereafter for the nanomaterial according to the invention were in the same range as stated in example 1.

In experiments for orienting the nonomaterial according to the invention, it has been found that, on arbitrary arrangement in a plastic matrix, the flat prisms according to the invention align along their 0k0, preferably along their 020, lattice plane as a result of applied external forces (pressure, shearing, etc.).

Example 4

Preparation of a Powder Sample of Examples 1 to 3 and of the Comparative Example for XRD Patterns For the preparation of a texture sample, a spatula of the powder sample is suspended in a little isopropanol to give a low-viscosity suspension, poured over a glass plate or an X-ray-amorphous plastic plate and dried so that as circular a region as possible of at least 15 mm diameter in the center of the plate is provided with a uniform covering of the powder and the flat prismatic crystals have an opportunity to become oriented parallel to one another. The powder sample can optionally be pressed flat with a further glass plate and fixed with a hairsetting spray or the like. The sample plate is mounted tangentially to the focusing circle and centrally in the sample holder of an X-ray powder diffractometer having Bragg-Brentano geometry and is measured with variable aperture V6 but otherwise any desired aperture settings. The measured diffraction spectra are evaluated using commercially available software for correction of the background and for measurement of the intensities (=peak areas) and the intensity ratio I(020+211):301 is calculated.

The invention claimed is:

1. A crystalline ion-conducting material consisting of $LiMPO_4$ nanoparticles, wherein M is Cr, Mn, Co, Fe or Ni or a mixture thereof, and the nanoparticles have a substantially flat prismatic form and a monomodal size distribution.

2. The crystalline material as claimed in claim 1, wherein a family of successive lattice planes run parallel to the basal face of the prism.

3. The crystalline material as claimed in claim 2, wherein the family of lattice planes are the 0k0 lattice planes, in which k is an integer $\geq 1$.

4. The crystalline material as claimed in claim 3, wherein the family of lattice planes contain the 020 lattice plane.

5. The crystalline material as claimed in claim 1, wherein the ratio of the intensities of two selected reflections in an X-ray powder diffraction pattern of the crystalline material are greater than 2.6:1, the reflections representing lattice planes are arranged perpendicular to one another, and a lattice plane is the 0k0 lattice plane.

6. The crystalline material as claimed in claim 5, wherein the intensity ratio of the reflections I(020+211):I(301) is greater than 2.6:1.

7. The crystalline material as claimed in claim 1, wherein the prism is an n-sided prism where n is 4.

8. The crystalline material as claimed in claim 7, wherein the ratio of the length l of the basal face of the prism to its height h is $\geq 4$.

9. The crystalline material as claimed in claim 6, wherein the length l of the basal face of the prism is in the range from 1 to 15 μm.

10. The crystalline material as claimed in claim 9, wherein the height h of the prism is from 10 to 100 nm.

11. A method for preparing a crystalline material as claimed in claim 1, which comprises
   a) preparing a precursor compound in solution from a lithium compound, a compound containing metal ions M and a phosphate compound,
   b) precipitating the precursor compound from the solution and optionally forming a suspension of the precursor compound,
   c) dispersing and/or milling the precursor compound and/or the suspension,
   d) reacting the precursor compound and/or the suspension under hydrothermal conditions,
   e) isolating the resultant crystalline material.

12. The method as claimed in claim 11, wherein the metal ions M are selected from the group consisting of Cr, Mn, Co, Fe, Ni and mixtures thereof.

13. The method as claimed in claim 11, wherein the dispersing or milling in c) begins before or during the precipitation of the precursor compound.

14. The method as claimed in claim 13, wherein the reaction product is dried after d).

15. The method as claimed in claim 14, wherein d) is carried out at a temperature in the range from 100 to 250° C.

16. The method as claimed in claim 11, wherein d) is carried out at a pressure of from 1 bar to 40 bar vapor pressure.

17. The method as claimed in claim 11, wherein a template compound is furthermore added in a).

18. The method as claimed in claim 11, wherein the lithium compound, the compound containing metal ions M and the phosphate compound in a) are mixed with one another.

19. The method as claimed in claim 11, wherein the lithium compound is LiOH or $Li_2CO_3$.

20. The method as claimed in claim 11, wherein the compound containing metal ions is selected from the group consisting of metal sulfates, halides, nitrates, phosphates, carboxylates and acetylacetonates.

21. The method as claimed in claim 11, wherein the phosphate compound is a phosphoric acid, a phosphate, a hydrogen phosphate or a dihydrogen phosphate.

22. The method as claimed in claim 11, wherein the precursor compound is prepared in water.

23. The method as claimed in claim 11, wherein the lithium compound, the compound containing metal ions M and the phosphate compound in a) are mixed with one another in the concentration ratio of 1:1:1 or with an Li excess of 1:1:3.

24. The crystalline material as claimed in claim 5, wherein the intensity ratio of the reflections I(020+211):I(301) is greater than 3:1.

25. The crystalline material as claimed in claim 6, wherein the length l of the basal face of the prism is in the range from 1 to 5 μm.

* * * * *

UNITED STATES PATENT AND TRADEMARK OFFICE
CERTIFICATE OF CORRECTION

| | | |
|---|---|---|
| PATENT NO. | : 8,053,075 B2 | Page 1 of 1 |
| APPLICATION NO. | : 11/910666 | |
| DATED | : November 8, 2011 | |
| INVENTOR(S) | : Norbert Schall et al. | |

It is certified that error appears in the above-identified patent and that said Letters Patent is hereby corrected as shown below:

Column 11, Line 50 reads: "the prism is an n-sided prism where n is 4" should read -- the prism is an n-sided prism where n is $\geq 4$ --.

Signed and Sealed this

Fourteenth Day of February, 2012

David J. Kappos
*Director of the United States Patent and Trademark Office*